United States Patent [19]

Nalbandyan

[11] 4,348,808
[45] Sep. 14, 1982

[54] HARVESTING TOOL

[76] Inventor: Harutyun G. Nalbandyan, 4421 Melbourne Ave. #5, Los Angeles, Calif. 90027

[21] Appl. No.: 216,294

[22] Filed: Dec. 15, 1980

[51] Int. Cl.³ .............................................. B26B 13/20
[52] U.S. Cl. ..................................................... 30/134
[58] Field of Search ........................... 30/134, 135, 124

[56] References Cited

U.S. PATENT DOCUMENTS

| | | | |
|---|---|---|---|
| 569,284 | 10/1896 | Jacks | 30/135 |
| 1,666,253 | 4/1928 | Blincoe | 30/135 |
| 2,086,081 | 7/1937 | Hollenbeck | 30/134 |
| 3,302,287 | 2/1967 | Kelly | 30/134 |
| 3,520,058 | 7/1970 | Pfaffenbach | 30/134 |
| 4,185,379 | 1/1980 | Amstutz | 30/134 |

Primary Examiner—Jimmy C. Peters
Attorney, Agent, or Firm—Jack C. Munro

[57] ABSTRACT

A harvesting tool to be used, principally, for the harvesting of grapes comprising a scissors device wherein the operating head of the scissors device includes a cutting blade. The operating head of the scissors device is to include structure to facilitate the grasping and holding of the stem of a cluster of grapes during the time of the cutting of the stem, at which time the user is to move to deposit the cut cluster of grapes to a particular desired area.

4 Claims, 10 Drawing Figures

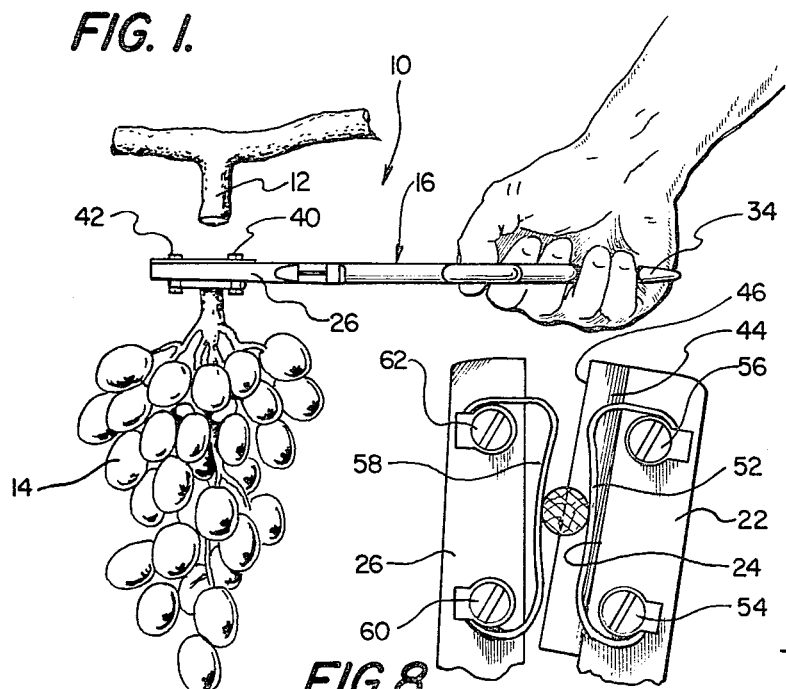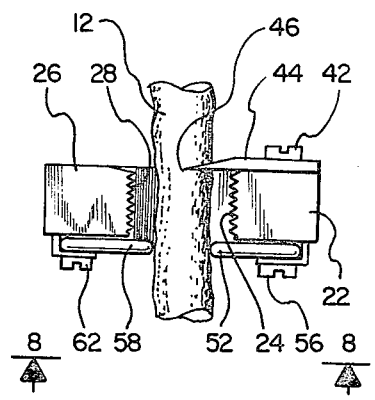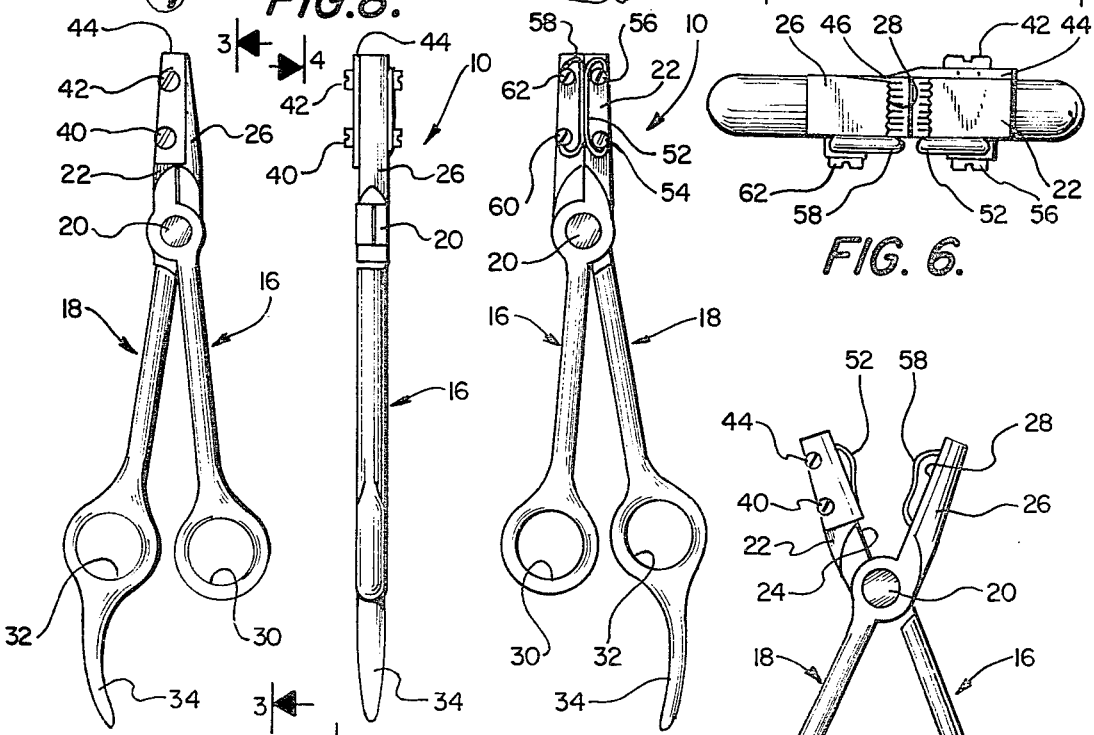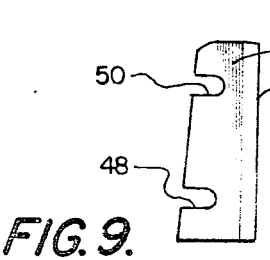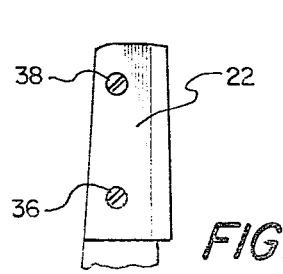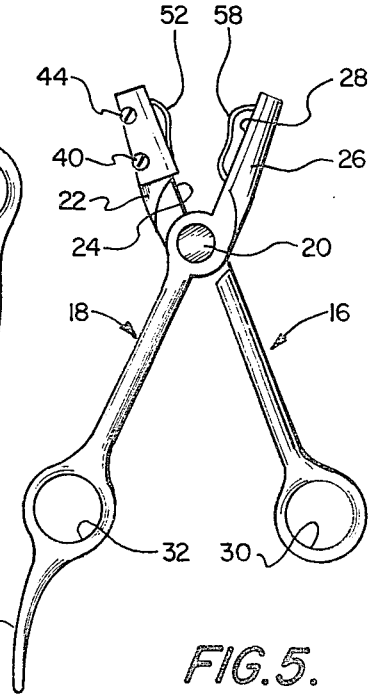

HARVESTING TOOL

BACKGROUND OF THE INVENTION

The field of this invention relates in particular, to a harvesting tool and principally a harvesting tool for harvesting grapes.

At the present time, the normal procedure for the gathering of grapes is a two-handed operation for the individual doing the harvesting. The operation requires that the individual carry a cutting device in one hand and once the stem of a cluster of grapes has been cut, this cluster of grapes is then caught with the individual's other hand and moved to a particular area to be deposited. This procedure is continually repeated until the grapes are completely harvested.

There is a need to construct a tool which facilitates the harvesting of grapes where the individual's can harvest grapes with both hands making the harvesting a one-handed operation versus a two-handed operation.

SUMMARY OF THE INVENTION

The harvesting tool of this invention comprises two separate elongated members, each of which has a handle section and an operating head section. The elongated members are pivotally connected together in a sissors fashion with the operating heads located adjacent each other and the graspable handle sections located adjacent each other. The operating head includes a knife which, during closing movement of the sissors action would cause the knife to cut the stem of a cluster of grapes which is positioned between the operating heads. Each operating head also includes a preliminary grasping device in the form of a deflectable wire. During the initial movement of the operating heads from an open position toward the closed position, the preliminary grasping members initially grasp the plant stem and continue to apply force against the stem of the plant during the entire closing movement of the elongated members. The preliminary grasping members insure that the plant stem will be grasped prior to the final grasping by the operating heads. The operator, after the stem has been cut, is then free to move and deposit the clustered group of grapes to a desired deposit area.

The primary feature of the structure of this invention is to construct a grape harvesting tool wherein clusters of grapes can be harvested and moved to a deposit area with a single operator's hand, thereby permitting one harvester to do as much harvesting as two separate individuals.

BRIEF DESCRIPTION OF THE DRAWING

FIG. 1 is a side elevational view of the harvesting tool of this invention illustrating usage of the tool;

FIG. 2 is a front elevational view of the harvesting tool of this invention showing the harvesting tool in the closed position;

FIG. 3 is a left side elevational view of the harvesting tool of this invention taken along line 3—3 of FIG. 2;

FIG. 4 is a back elevational view of the harvesting tool of this invention along line 4—4 of FIG. 3;

FIG. 5 is a front elevational view similar to FIG. 2 but showing the harvesting tool in the open position;

FIG. 6 is an end view of the operating end of the harvesting tool of this invention showing the harvesting tool clamped onto a plant stem;

FIG. 7 is a view similar to FIG. 6 but showing the harvesting tool at the initial position of contact with the plant stem;

FIG. 8 is an enlarged, segmental, back view showing the wire preliminary grasping members achieving contact with the plant stem taken along line 8—8 of FIG. 7;

FIG. 9 is a plan view of just the knife blade, which is employed in conjunction with the harvesting tool of this invention; and FIG. 10 is a front elevational view of the operating head of one of the sissor members within the harvesting tool of this invention showing the structure which mounts the knife blade of FIG. 9.

DETAILED DESCRIPTION OF THE SHOWN EMBODIMENT

Referring particularly to the drawing, there is shown in FIG. 1, the harvesting tool 10 of this invention which is to be employed to cut a plant stem 12 of a cluster of grapes 14. Upon operation of the harvesting tool 10, the user not only severs the stem 14, but the tool 10 also grasps and holds the portion of the stem 12 which is attached to the cluster of grapes 14 and which permits the user to move the cluster 14 to a particular desired area to be deposited. A typical desired area would be a container, such as a box.

The harvesting tool 10 comprises a first elongated member 16 and a second elongated member 18. The elongated members 16 and 18 are pivotally connected together through the pivot connection 20 intermediate the ends of the members 16 and 18. The pivot connection 20 is deemed to be conventional and comprises no more than a fastener which secures the members 16 and 18 together and permits pivotal movement therebetween. The use of such pivot connections are extremely common within conventional sissor structures.

The outer end 22 of the elongated member 16 includes a first grasping section in the form of planar surface 24. Similarly, the outer end 26 of the elongated member 18 includes a second grasping means in the form of second planar surface 28. The planar surfaces 24 and 28 are in a facing relationship to each other. Also, the planar surfaces 24 and 28 will normally include some form of serrations so as to facilitate grasping of the plant stem 12.

The inner end of the elongated member 16 is formed into a handle means in the form of a finger opening 30. A thumb opening 32 is formed within the inner end of the elongated member 18. An extension 34 is also formed within the inner end of the elongated member 18 which is adapted to be located within the palm of the user's hand, as is clearly shown within FIG. 1.

Formed within the upper surface of the outer end 22 are spaced-apart holes 36 and 38. Bolt fasteners 40 and 42 are to respectively threadably connect with the holes 36 and 38. A knife blade 44, which has an outer cutting edge 46, is constructed to include a pair of spaced-apart U-shaped slots 48 and 50. The slot 50 is to connect with the bolt 42, with the slot 48 to connect with the bolt 40. The bolts 40 and 42 are to be tightened when the knife blade 44 is located in the position as shown within FIGS. 6 and 7. It is to be noted that the knife blade 44 can be readily removed and replaced if the cutting edge 46 has become dull.

Mounted on the backside of the outer end 22 is a first wire member 52. The wire member 52 is fixedly secured at its ends thereof by means of rivets 54 and 56 to the outer end 22. In a similar manner, a wire member 58 is fixedly attached by means of rivets 60 and 62 to the outer end 26. It is to be noted that the wire members 58 and 56 are readily bendable, or deflectable. The purpose of the wire members 52 and 58 is that they are to be the first members to come into contact with the stem 12. As the knife blade 46 is moved through the stem 12 to effect cutting, the portion of the stem 12 which is contained within the cluster of grapes 14 is thereby held by the wire members 52 and 58. The force of the wire members 52 and 58 is sufficient to insure that the cluster of grapes and its connected stem will be held position until the stem 12 is contacted by the main grasping surfaces 24 and 28.

What is claimed is:

1. A harvesting tool comprising:
    a first elongated member having a first outer end and a first inner end, said first outer end having first grasping means, said first inner end having first handle means;
    a second elongated member having a second outer end and a second inner end, said second outer end having second grasping means, said second inner end having second handle means, said second elongated member being pivotally connected by pivot means to said first elongated member, said pivot means being located intermediate said ends of both said first and second elongated members, said first grasping means to cooperate with said second grasping means to facilitate manual grasping and holding of a plant stem;
    said first grasping means including a first preliminary grasping member and a first main grasping member, said second grasping means including a second preliminary grasping member and a second main grasping member, said first and second main grasping members to be in secure contact with the plant stem when said first main grasping member is located directly adjacent said second main grasping member, initial grasping of the plant stem is achieved by the combined grasping action of said first and second preliminary grasping members prior to movement into contact with the plant's stem by said first and second main grasping members; and
    cutting means mounted on said first outer end for cutting the plant stem.

2. The harvesting tool as defined in claim 1 wherein: said cutting means comprising a knife blade movable within a cutting plane, a planar cam surface mounted on said second outer end, said planar cam surface being inclined with respect to said plane of said knife blade, said cam surface to be contacted by said knife blade during the cutting action of said knife blade.

3. The harvesting tool as defined in claim 2 wherein: both said first and second preliminary grasping members being deflectable so as to accommodate the plant stem therebetween during movement of said first and second main grasping members into contact with the plant stem.

4. The harvesting tool as defined in claim 3 wherein: both of said first and second preliminary grasping members being formed of wire.

* * * * *